US010207923B2

(12) United States Patent
Kim et al.

(10) Patent No.: US 10,207,923 B2
(45) Date of Patent: Feb. 19, 2019

(54) MULTI-CHANNEL UPRIGHT REFORMER FOR FUEL CELL MERGED WITH HEATER

(71) Applicant: HanjungNCS. Co., Ltd, Yeongcheon-si, Gyeongsangbuk-do (KR)

(72) Inventors: Hwan Sik Kim, Yeongcheon-si (KR); Hyeong-Kyun Shin, Gyeongsan-si (KR); Chang Dae Oh, Daejeon (KR); Jung-hyun Seo, Yeongcheon-si (KR); Jin hoon Song, Goheung-gun (KR)

(73) Assignee: HANJUNGNCS. CO., LTD, Yeongcheon-si, Gyeongsangbuk-Do (KR)

( * ) Notice: Subject to any disclaimer, the term of this patent is extended or adjusted under 35 U.S.C. 154(b) by 200 days.

(21) Appl. No.: 14/934,583

(22) Filed: Nov. 6, 2015

(65) Prior Publication Data

US 2016/0220975 A1 Aug. 4, 2016

(30) Foreign Application Priority Data

Jan. 30, 2015 (KR) .................. 10-2015-0014637

(51) Int. Cl.
*B01J 8/02* (2006.01)
*C01B 3/38* (2006.01)
(Continued)

(52) U.S. Cl.
CPC ............... *C01B 3/38* (2013.01); *B01J 8/001* (2013.01); *B01J 8/067* (2013.01); *B01J 19/249* (2013.01);
(Continued)

(58) Field of Classification Search
CPC combination set(s) only.
See application file for complete search history.

(56) References Cited

U.S. PATENT DOCUMENTS 2,201,620 A * 5/1940 La Mont ................. F22B 29/02
122/235.11
RE24,311 E * 5/1957 Mader ..................... C01B 3/382
252/373
(Continued)

FOREIGN PATENT DOCUMENTS

JP 2002-529895 A 9/2002
JP 2004-501759 A 1/2004
(Continued)

*Primary Examiner* — Kaity V Chandler
(74) *Attorney, Agent, or Firm* — John K. Park; Park Law Firm

(57) ABSTRACT

A multi-channel upright reformer for a fuel cell is provided, which has a simple structure by breaking from an existing complicated channel structure to allow fluids such as fuel and vapor to be stably flow, thereby improving durability and achieving an efficient reforming reaction and an efficient operation of the fuel cell. A method for manufacturing compactly a reformer by minimizing an area where heat exchange is performed and expand of a fuel cell due to the resulting decrease in manufacturing cost. Also a reformer for semipermanently using by frequently exchanging a catalyst used in a reforming reaction and supply the reformer at a low price by significantly decreasing cost consumed for the catalyst is provided.

10 Claims, 9 Drawing Sheets

(51) Int. Cl.
  *B01J 8/00*     (2006.01)
  *B01J 8/06*     (2006.01)
  *B01J 19/24*    (2006.01)
  *H01M 8/0612*   (2016.01)

(52) U.S. Cl.
  CPC ............... *B01J 2219/2453* (2013.01); *B01J 2219/2458* (2013.01); *B01J 2219/2462* (2013.01); *B01J 2219/2481* (2013.01); *C01B 2203/0233* (2013.01); *C01B 2203/066* (2013.01); *C01B 2203/0811* (2013.01); *C01B 2203/1241* (2013.01); *H01M 8/0618* (2013.01); *Y02P 20/52* (2015.11); *Y02P 70/56* (2015.11)

(56) References Cited

U.S. PATENT DOCUMENTS

| | | | | |
|---|---|---|---|---|
| 3,119,671 | A * | 1/1964 | Russell | B01J 8/062 196/110 |
| 4,113,441 | A * | 9/1978 | Suzuki | B01J 8/0005 122/246 |
| 5,006,131 | A * | 4/1991 | Karafian | B01J 8/062 422/201 |
| 5,997,594 | A * | 12/1999 | Edlund | B01D 53/228 422/217 |
| 6,413,479 | B1 * | 7/2002 | Kudo | B01J 8/0465 208/133 |
| 7,332,003 | B1 * | 2/2008 | Li | C01B 3/386 422/198 |
| 2002/0004154 | A1 * | 1/2002 | Pastula | C01B 3/38 429/423 |
| 2003/0010481 | A1 * | 1/2003 | Northrop | F28F 1/24 165/168 |
| 2003/0223926 | A1 * | 12/2003 | Edlund | B01J 8/0221 422/198 |
| 2004/0068933 | A1 * | 4/2004 | Nakamura | B01B 1/005 48/127.9 |
| 2005/0194120 | A1 * | 9/2005 | Lomax, Jr. | F28D 7/0075 165/100 |
| 2006/0008683 | A1 * | 1/2006 | Kim | H01M 8/0612 429/412 |
| 2006/0137246 | A1 * | 6/2006 | Kumar | B01J 8/0257 48/61 |
| 2007/0099039 | A1 * | 5/2007 | Galloway | B09B 3/00 429/410 |
| 2007/0104625 | A1 * | 5/2007 | Su | B01J 8/0453 422/618 |
| 2008/0171243 | A1 * | 7/2008 | Lee | C01B 3/384 48/61 |
| 2008/0296018 | A1 * | 12/2008 | Zubrin | C10G 1/04 166/267 |
| 2010/0145104 | A1 * | 6/2010 | Kosters | B01J 8/06 568/451 |
| 2012/0014850 | A1 * | 1/2012 | Son | B01B 1/005 422/608 |
| 2013/0202977 | A1 * | 8/2013 | Sonnichsen | H01M 8/0618 429/423 |
| 2014/0065500 | A1 * | 3/2014 | Hong | C01B 3/384 429/415 |
| 2014/0369897 | A1 * | 12/2014 | Verykios | B01J 8/0214 422/162 |
| 2015/0295253 | A1 * | 10/2015 | Hong | H01M 8/0631 429/425 |
| 2015/0318564 | A1 * | 11/2015 | Dong | H01M 8/0631 429/423 |

FOREIGN PATENT DOCUMENTS

| | | |
|---|---|---|
| KR | 10-2004-0047023 A | 4/2004 |
| KR | 10-2002-0063352 A | 3/2005 |
| KR | 1020060094294 A | 9/2006 |
| KR | 10-2005-0030566 A | 10/2006 |

\* cited by examiner

A - A

1

MULTI-CHANNEL UPRIGHT REFORMER FOR FUEL CELL MERGED WITH HEATER

BACKGROUND OF THE INVENTION

Field of the Invention

The present invention relates to a multi-channel upright reformer for a fuel cell merged with a heater, and more particularly, to a multi-channel upright reformer for a fuel cell merged with a heater which facilitates mounting of a combustor and previously prevents pressure from being dropped by configuring one or more channels in an upright cross structure to achieve an efficient reforming reaction and is manufactured with high durability and a compact size to improve economic efficiency.

Related Art

In general, a fuel cell is a generation system that directly converts chemical reaction energy of hydrogen contained in a hydrocarbon based material such as methanol, ethanol, and natural gas and oxygen into electric energy.

The fuel cell is classified into a phosphate fuel cell, a molten carbonate fuel cell, a solid oxide fuel cell, a polyelectrolyte or alkali fuel cell, and the like according to the type of electrolyte used in the fuel cell.

The respective fuel cells fundamentally operate according to the same principle, but types, operating temperatures, catalysts, and electrolytes of fuel are different from each other.

Among them, the solid oxide fuel cell (SOFC) as a fuel cell using solid oxide such as zirconium oxide ($ZrO_2$) or ceria ($CeO_2$) as electrolyte generally operates at a high temperature of 700 to 1000° C. and can be used as the generation system in that since oxide ions ($O_2-$) are conducted, oxygen in the air electrochemically reacts even in hydrocarbon such as methane or butane as hydrogen in principle.

Further, a generation solid oxide fuel cell system includes a stack serving to produce electricity, an M-BOP serving to supply fuel to the inside of the stack and collect fuel and heat discharged and abandoned from the stack, and an E-POP serving to convert DC into AC so as to supply the produced electricity to home appliances and the mechanical balance of plants (M-BOP) includes a reformer that converts city gas as fuel of the fuel cell into hydrogen.

The reformer is a content primarily to be handled in the present invention and the reformer is a device that converts or reforms fuel containing hydrogen into hydrogen gas through a chemical catalytic reaction and in general, when a schematic configuration of the reformer is described, the reformer is constituted by a combustion reaction unit generating and supplying heat energy, generating hydrogen gas from the fuel by using the heat energy, and a carbon monoxide removing unit reducing the concentration of oxide monoxide contained in the hydrogen gas.

The reformer having the above configuration has a channel structure which is very complicatedly configured in order to increase efficiency in heat exchange as disclosed in Korean Patent Application No. 10-2004-0047023 (Title of Invention: FUEL CELL SYSTEM AND REFORMER USED THERETO) and Korean Patent Application No. 10-2005-0030566 (Title of Invention: PLATE TYPE REFORMER AND FUEL CELL SYSTEM HAVING THE SAME).

That is, channels (a flow path and flow passages of water and gas) in the related art are configured in a winding form as disclosed in the prior technical data and the winding form disturbs the flow of fluids and decreases the velocity of the flow so as to maximize the efficiency in heat exchange, but a pressure drop is rather amplified and hydrogen as fuel of the stack is not smoothly supplied due to inclination to the maximization of the efficiency in heat exchange, and as a result, a problem that the stack may malfunction comes to the fore.

In particular, since the heat exchange process is performed in the channel which is winding and complicated, the volume needs to be increased for efficient heat exchange and a problem that the durability of a reactor deteriorates due to a crack by heat expansion under a high-temperature condition.

Moreover, the reformer has a structure in which it is difficult or impossible to exchange the catalyst, and as a result, exchanging the catalyst may be difficult and the catalyst is supported at one side of the channel or only a special type catalyst is configured to be used, and as a result, there is a problem that use convenience and economic efficiency are extremely low.

In addition, as disclosed in the prior art, since the fuel and vapor enter while being mixed at an inlet, when room-temperature fuel and high-temperature vapor meet, the high-temperature vapor is condensed and some of the vapor is converted into a phase of water, and as a result, a two-phase behavior is shown. This blocks the narrow and winding channel and increases internal pressure and water expanded by internal evaporation pressure further increases the internal pressure to bring about serious durability problems such as total damage of the entirety of a welded part including a crack of the welded part, thereby preventing an efficiency operation of the fuel cell.

Further, in the prior art, a water heater needs to be separately provided at a front end of the reactor, and as a result, construction cost of a system may increase and an operating method may be complicated.

In addition, as disclosed in the prior art, the reformer in the related art has a structure in which multiple disk-type plates are horizontally stacked and under such a structure, a combustor cannot be mounted, and as a result, electricity is used as a heat source or high-priced platinum is used as a combustion catalyst and the reformer is not practical and popular due to a burden such as significant economic cost.

Accordingly, a reformer for a fuel cell having a compact size, which has improved the durability of the fuel cell and the reformer configured in the fuel cell and reduces an economic cost burden and a fuel cell with the reformer are required.

SUMMARY OF THE INVENTION

An object of the present invention is to provide a multi-channel upright reformer for a fuel cell, which has a simple structure by breaking from an existing complicated channel structure to allow fluids such as fuel and vapor to be stably flow, thereby improving durability and achieving an efficient reforming reaction and an efficient operation of the fuel cell.

Another object of the present invention is to compactly manufacture a reformer by minimizing an area where heat exchange is performed and expand of a fuel cell due to the resulting decrease in manufacturing cost.

Yet another objet of the present invention is to semipermanently use a reformer by frequently exchanging a catalyst used in a reforming reaction and supply the reformer at a low price by significantly decreasing cost consumed for the catalyst.

In accordance with an embodiment of the present invention, a multi-channel upright reformer for a fuel cell merged with a heater includes: a heat transfer unit 100 in which each of a water inflow pipe 110 through which water flows into a preheating channel part 500 and an inflow pipe 120 through which natural gas for reforming flows into the preheating channel part 500 is configured, a discharge pipe 130 through which reformed reforming gas is discharged is formed on the bottom of the inflow pipe 120 and an exhaust port 140 through which a combustion exhaust gas is discharged is formed on the top of the inflow pipe 120, a connection unit 150 is integrally formed on the other side of the exhaust port 140 so as to be easily hermetically joined coupled with the combustion supporting unit 200, and an exhaust gas channel part 700 guiding the combusted exhaust gas to be exhausted, a reforming channel part 600 in which an actual reforming reaction is achieved and the discharge pipe 130 is connected and configured, and the preheating channel part 500 in which the water inflow pipe 110 and the inflow pipe 120 through which the water and the natural gas flow are connected and configured and preheating is achieved are integrally configured on the other side of the exhaust port 140, which are configured therein; a combustion supporting unit 200 on which either any one of a combustion part 250 generating heat through combustion by using the natural gas and stack unreaction fuel as raw materials or a heater which an inflow passage of high-temperature air when the combustion part 250 is not mounted is detachably mounted and fixed; a catalyst input unit 300 having a structure in which opening is easy at the time of inputting the catalyst input for the reforming reaction and mounted on the other side of the inflow pipe 120 through which the natural gas flows in a structure to be easily opened with the heat transfer unit 100; and a distribution housing 400 guiding the reforming gas subjected to the reforming reaction to be discharged through the discharge pipe 130 in the reforming channel part 600 and detachably mounted on one side of the bottom of the heat transfer unit 100, wherein the heat transfer unit 100 includes each of one or more preheating channel parts 500 in which the water and the natural gas flow and are preheated, one or more reforming channel parts 600 guiding the actual reforming reaction of the natural gas and the water by the catalyst, and one or more exhaust gas channel parts 700 guiding gas combusted in the combustion unit 200 to be discharged, and the reforming channel parts 600 are configured at left and right sides based on the center of the preheating channel part 500, respectively, the exhaust gas channel parts 700 are configured at left and right sides of the reforming channel part 600, respectively, and the preheating channel parts 500, the reforming channel parts 600, and the exhaust gas channel parts 700 are uprightly mounted on a receiving groove 160 to facilitate preheating and discharge of the combusted gas.

A sealing gasket 260 may be configured between the connection unit 150 of the heat transfer unit 100 and the combustion supporting unit 200.

A filter 170 for filtering minute dust may be configured on one side of the discharge pipe 130 toward the heat transfer unit 100.

The exhaust port 140 may have a connection unit 141 so as to be fixed with an extended pipe by any one method of flange joining, screw coupling, and a fusion coupling method by welding.

A 3D structure combustor 241 of which the top is opened may be provided in the combustion part 250 and a heat diffusion unit 242 constituted by either of a panel sheet or a metallic net having multiple through-holes to guide heat to be diffused in overall may be configured inside the combustor 241 and a connection unit 210 corresponding to the connection unit 150 of the heat transfer unit 100 may be formed on one side of the edge of the combustor 241, and each of an air inflow port 220 through which combustion air flows and a natural gas inflow port 230 through which combustion natural gas flows may be configured at one side of the combustor 241 and an ignition switch 240 may be provided on one front side of the combustor 241 to transfer heat to the preheating channel part 500.

The catalyst input unit 300 may be configured to include a mounting block 310 having a input/discharge hole 311 which facilitates coupling with the heat transfer unit 100 and is capable of inputting the catalyst, a catalyst fixing bar 320 inserted into the input/discharge hole 311 to stably support and fix the catalyst, a cover 340 fastened and fixed to the mounting block 310 in order to prevent the catalyst fixing bar 320 from being separated and removed, and a gasket 330 maintaining airtightness between the cover 340 and the mounting block 310.

The distribution housing 400 may be configured to be easily mounted on the heat transfer unit 100 and have a semicylindrical shape in which the distribution housing 400 is cut in the longitudinal direction and has a distribution chamber 410 to facilitate a flow including inflow and outflow of gas, which is formed therein.

The preheating channel part 500 integrated with the heat transfer unit 100 may be formed by a disk-like plate and an outflow preventing jaw 510 may be configured on the periphery of the preheating channel part 500 so as to prevent the water and the natural gas which flow in from flowing out and an outlet groove 520 guiding gas to easily move to the reforming channel part 600 may be formed on a lower corner, an injection unit 530 having an injection 531 temporarily storing and uniformly distributing and minutely injecting the water, which is integrally configured on the bottom thereof may be configured on one side of the water inflow pipe 110 through which the water flows, and a heating fin 540 may be provided below the injection unit 530 and a distribution unit 541 inclined to uniformly distribute and move the natural gas which flows in downward may be formed above the heat transfer fin 540 and an extension opening part 542 of which the end extends toward the outlet groove 520 may be configured on the other side of the distribution part 541 so as to easily discharge mixed gas.

The reforming channel part 600 may be formed by the disk-like plate and an outflow preventing jaw 610 may be configured on the periphery of the reforming channel part 600 so as to prevent the mixed gas which flows from the preheating plate 500 from flowing out, an inflow groove 620 through which the mixed gas discharged from the preheating plate 500 flows may be formed on the lower corner, and an input groove 630 may be configured on the top of the inflow groove 620 so that the catalyst input through the catalyst input unit 300 flows into the reforming plate 600, while a distribution diffusion layer 640 may be configured on the inner bottom of the reforming channel part 600 so that the mixed gas which flows through the inflow groove 620 is uniformly distributed.

The exhaust gas channel part 700 may be formed by the disk-like plate and has a structure in which the top and the bottom are opened and include an outflow preventing jaw 710 configured on the side thereof so as to prevent the exhausted gas from flowing out, and a heat transfer fin 720 may be mounted inside the outflow preventing jaw 710.

One or more sensors 800 may be mounted and fixed onto an exterior of the heat transfer unit 100 so as to sense an internal temperature of the preheat transfer unit 100 and an exhaust state of the catalyst.

A multi-channel upright reformer for a fuel cell merged with a heater provided in the present invention has a simple structure by breaking from a structure of a winding minute path (channel) in which a pressure drop is severe in the related art to reduce or minimize the pressure drop and a capacity is easily expanded through channel extension in left and right directions according to a reforming capacity and fluids such as fuel and vapor can stably flow, and as a result, durability is improved and the fluids are seamlessly and stably supplied to a stack through an efficient reforming reaction.

Further, the reformer can be compactly manufactured by minimizing an area where heat exchange is performed to decrease manufacturing cost and the reformer is semipermanently used and low-priced catalysts including a pellet type, a sphere type, and the like are easily used because catalysts used for a reforming reaction can be frequently exchanged, thereby significantly reducing operating cost.

In addition, a reforming unit and a preheat transfer unit are integrated as one in a heat transfer unit, and as a result, a separate preheater cannot be provided and a pretreatment process can be simplified, thereby significantly reducing prime cost.

DESCRIPTION OF EXEMPLARY EMBODIMENTS

Hereinafter, the present invention will be described in detail with reference to the accompanying drawings and a preferred embodiment.

Figure 1:
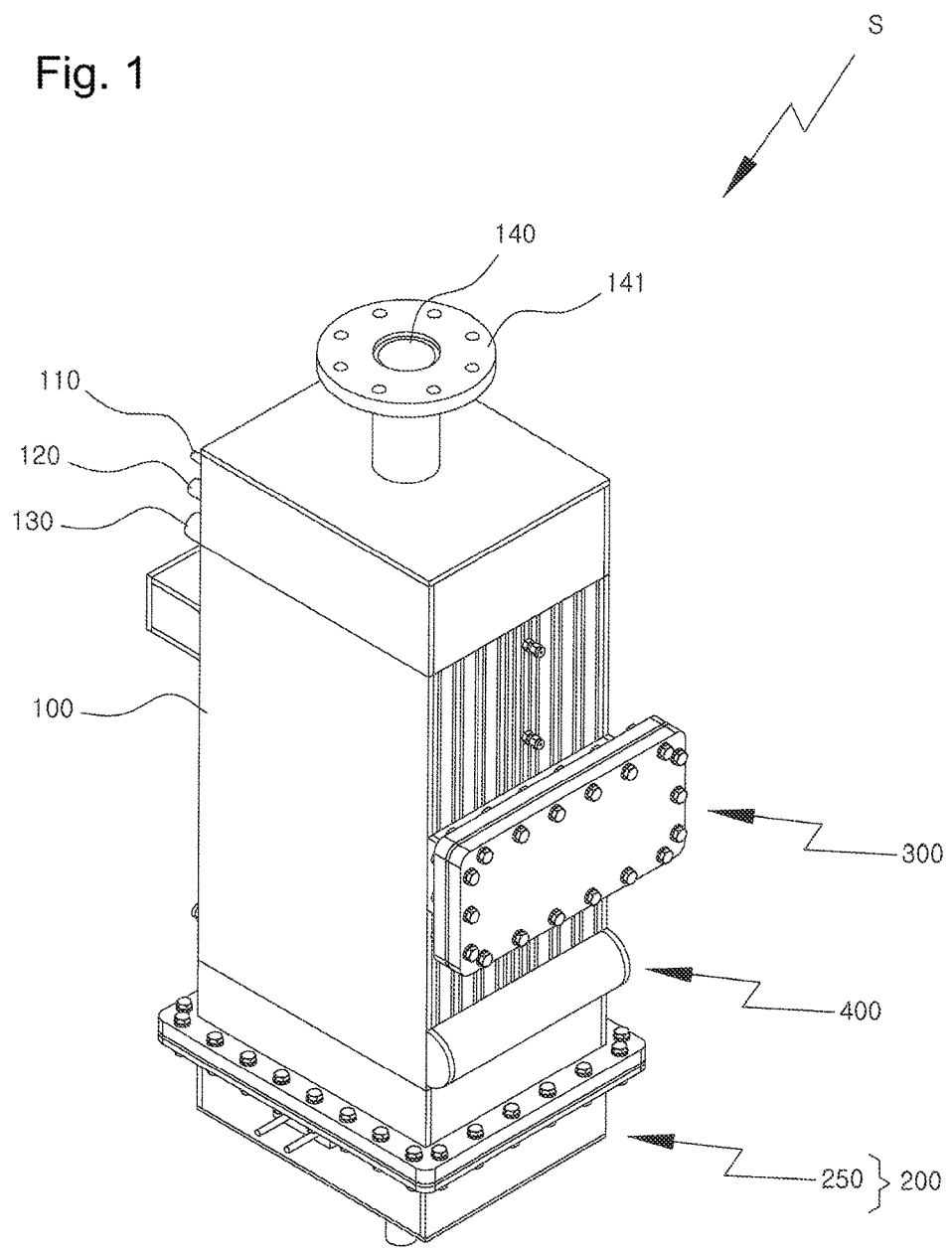
FIG. 1 is a perspective view showing a preferred embodiment of the present invention.
Figure 2:
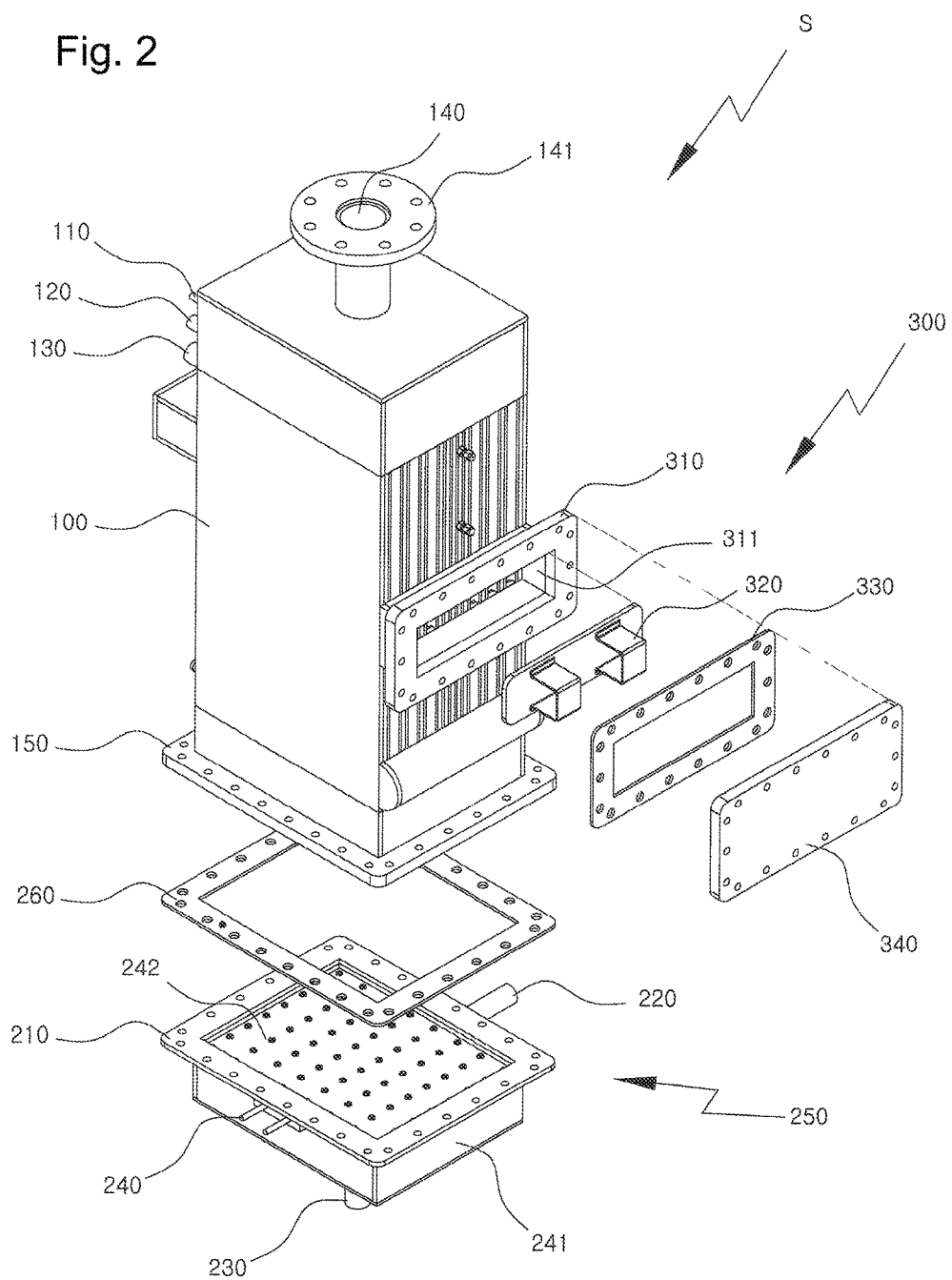
FIG. 2 is an exploded perspective view showing a preferred embodiment of the present invention.
Figure 3:
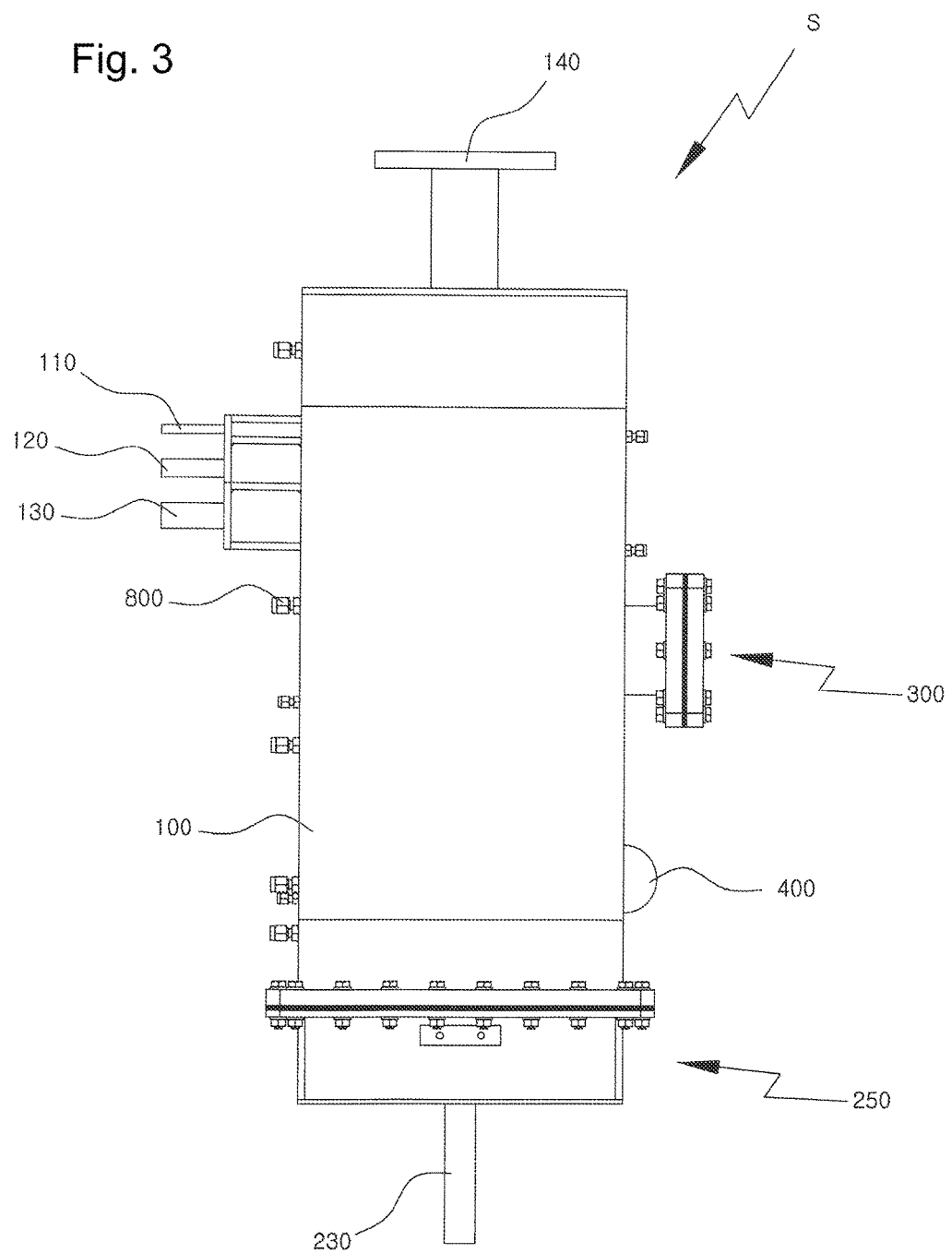
FIG. 3 is a front view showing a preferred embodiment of the present invention.
Figure 4:
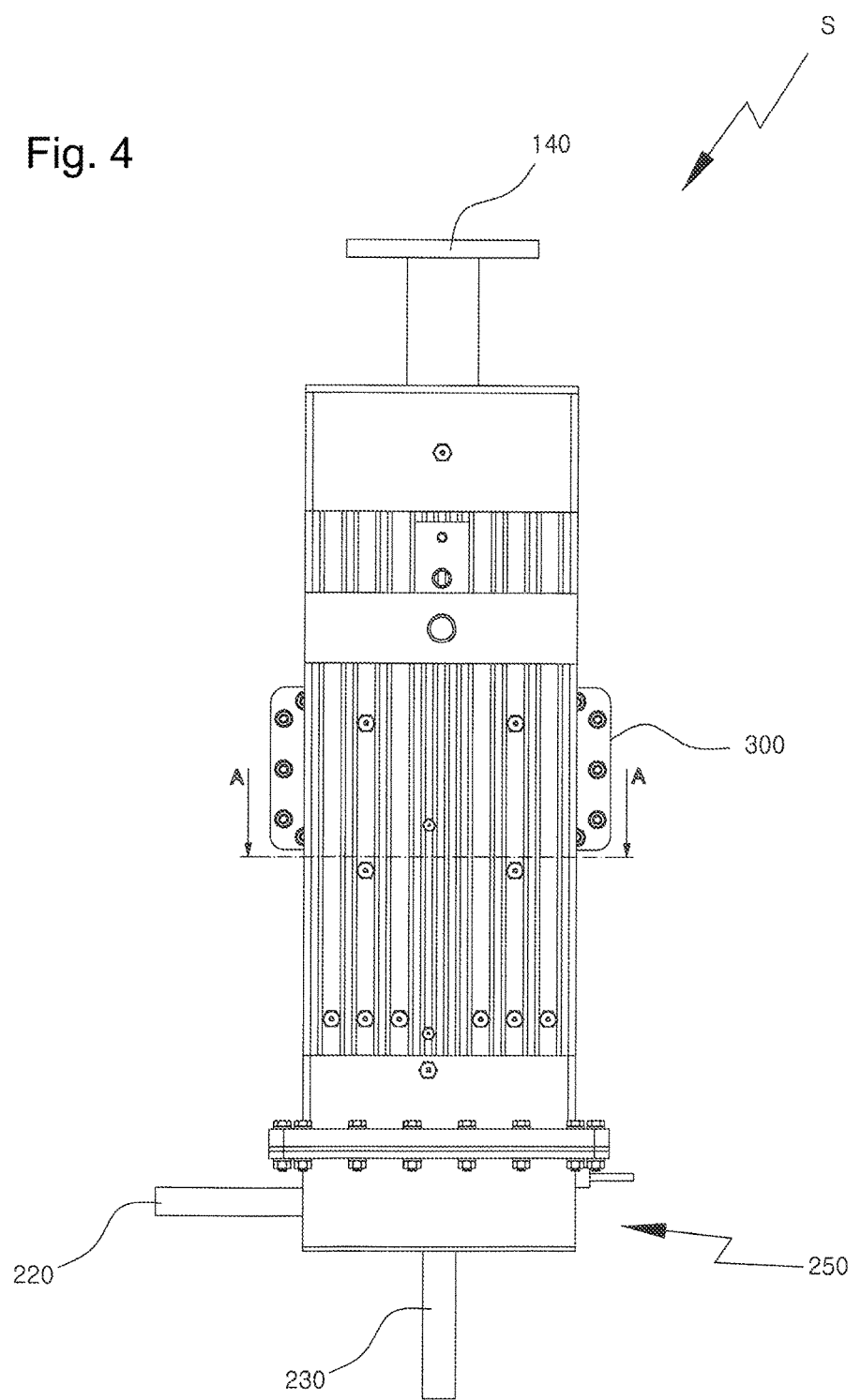
FIG. 4 is a side view showing a preferred embodiment of the present invention.
Figure 5:
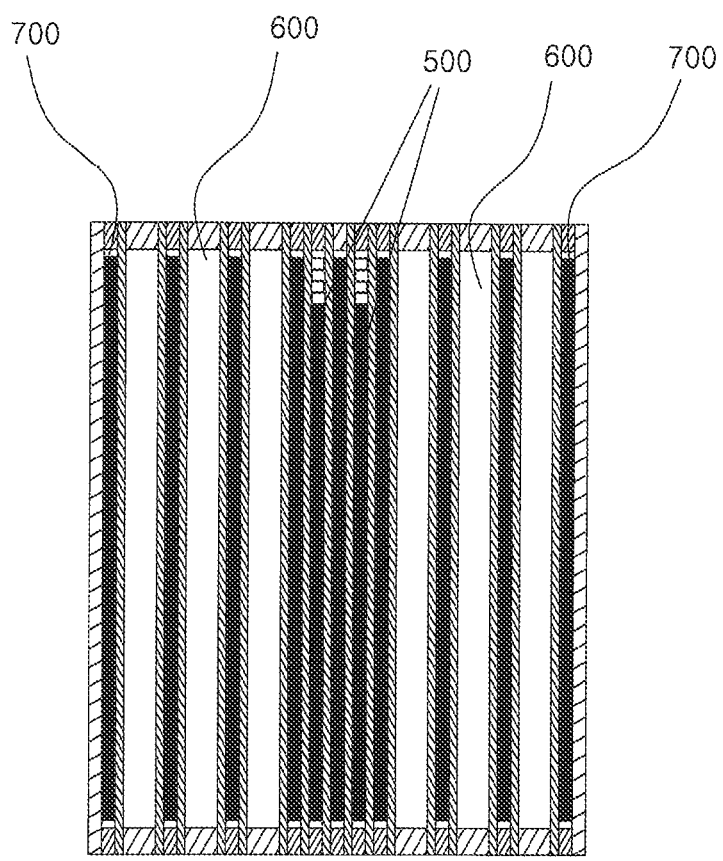
FIG. 5 is a schematic plan cross-sectional view showing a preferred embodiment of the present invention.

First, a core of a multi-channel upright reformer S for a fuel cell merged with a heater provided in the present invention is constituted by a heat transfer unit 100 in which a preheating channel part 500, a reforming channel part 600, and an exhaust gas channel part 700 are uprightly mounted and integrally configured, a combustion supporting unit 200 detachably mounted and fixed on the bottom of the heat transfer unit 100, a catalyst input unit 300 mounted on the side of the heat transfer unit 100 to frequently input a catalyst whenever the catalyst is exhausted, and a distribution housing 400 facilitating movement of gas from the preheating channel part 500 to the reforming channel part 600 as shown in FIGS. 1 and 2.

In this case, the heat transfer unit 100 includes a water inflow pipe 110 through which water flows into the preheating channel part 500 and an inflow pipe 120 through which natural gas for reforming flows into the preheating channel part 500 as shown in FIGS. 1 and 2.

Further, a discharge pipe 130 through which reformed reforming gas is discharged is formed on the bottom of the inflow pipe 120 and an exhaust port 140 through which a combustion exhaust gas is discharged is formed on the top of the inflow pipe 120, a connection unit 150 is integrally formed on the other side of the exhaust port 140 so as to be easily hermetically joined coupled with the combustion supporting unit 200 and the exhaust gas channel part 700 guiding the combusted exhaust gas to be exhausted, the reforming channel part 600 in which an actual reforming reaction is achieved and the discharge pipe 130 is connected and configured, and the preheating channel part 500 in which the water inflow pipe 110 and the inflow pipe 120 through which the water and the natural gas flow are connected and configured and preheating is achieved are integrally configured on the other side of the exhaust port 140.

Moreover, one or more sensors 800 are mounted and fixed onto an exterior of the heat transfer unit 100 so as to sense an internal temperature of the preheat transfer unit 100 and an exhaust state of the catalyst, and as a result, a user may frequently check the internal temperature of the heat transfer unit 100 and the exhaust state of the catalyst.

Further, the heat transfer unit 100 includes each of one or more preheating channel parts 500 in which the water and the natural gas flow and are preheated, one or more reforming channel parts 600 guiding the actual reforming reaction of the natural gas and the water by the catalyst, and one or more exhaust gas channel parts 700 guiding gas combusted in the combustion unit 200 to be discharged as shown in FIGS. 5 to 8 and herein, the reforming channel parts 600 are configured at left and right sides based on the center of the preheating channel part 500, respectively, the exhaust gas channel parts 700 are configured at left and right sides of the reforming channel part 600, respectively, and the preheating channel parts 500, the reforming channel parts 600, and the exhaust gas channel parts 700 are uprightly mounted on a receiving groove 160 to facilitate preheating and discharge of the combusted gas.

In this case, when the respective channels 500, 600, and 700 are mounted on the heat transfer unit 100, the respective channels 500, 600, and 700 are integrally configured so as to maintain a hermetical state and the respective channels 500, 600, and 700 may be fused and fixed by welding.

The respective channels 500, 600, and 700 are uprightly configured as described above to reduce a total volume required for heat exchange and heat is also more stably and efficiently transferred than a recumbent structure in the related art.

In particular, capacity extension is impossible due to various problems including heat transfer and heat exchanged in the recumbent structure in the related art, while the present invention provides an upright structure, and as a result, the arbitrary capacity extension may be impossible and disturbance of an operation of equipment is not caused in spite of the capacity extension.

Further, a sealing gasket 260 is configured between the connection unit 150 of the heat transfer unit 100 and the combustion supporting unit 200 as shown in FIG. 2.

Figure 7:
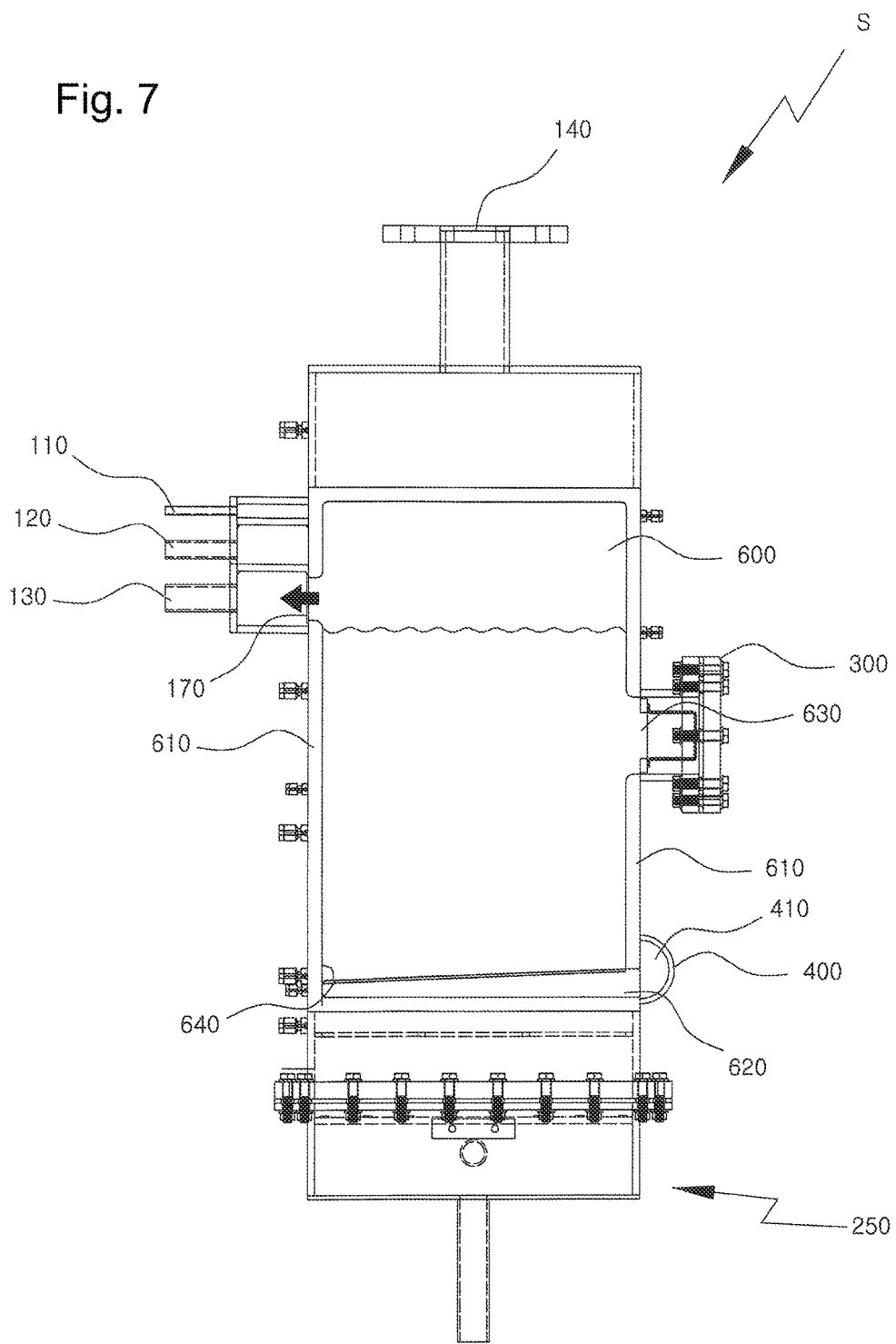
FIG. 7 is a front configuration diagram showing a state in which a reforming channel part in the reformer of the present invention is mounted.

In addition, a filter 170 for filtering minute dust is configured on one side of the discharge pipe 130 toward the heat transfer unit 100 as shown in FIG. 7 and the exhaust port 140 has a connection unit 141 so as to be coupled and fixed with an extended pipe by any one method of flange joining, screw coupling, and a fusion coupling method by welding.

Further, either any one of a combustion part 250 generating heat through combustion by using the natural gas and stack unreaction fuel as raw materials or a heater which an inflow passage of high-temperature air when the combustion part 250 is not mounted is detachably mounted and fixed onto the combustion supporting unit 200 as shown in FIG. 2.

In this case, a 3D structure combustor 241 of which the top is opened is provided in the combustion part 250 and a heat diffusion unit 242 constituted by either of a panel sheet or a metallic net having multiple through-holes to guide heat to be diffused in overall is configured inside the combustor 241 as shown in FIG. 2.

Further, a connection unit 210 corresponding to the connection unit 150 of the heat transfer unit 100 is formed on one side of the edge of the combustor 241, and each of an air inflow port 220 through which combustion air flows and a natural gas inflow port 230 through which combustion natural gas flows are configured at one side of the combustor 241 and an ignition switch 240 is provided on one front side of the combustor 241 to transfer heat to the preheating channel part 500.

Further, the connection units 150 and 210 may be coupled and fixed by any one method of the flange joining, the screw coupling, and the fusion coupling method by welding.

Figure 9:
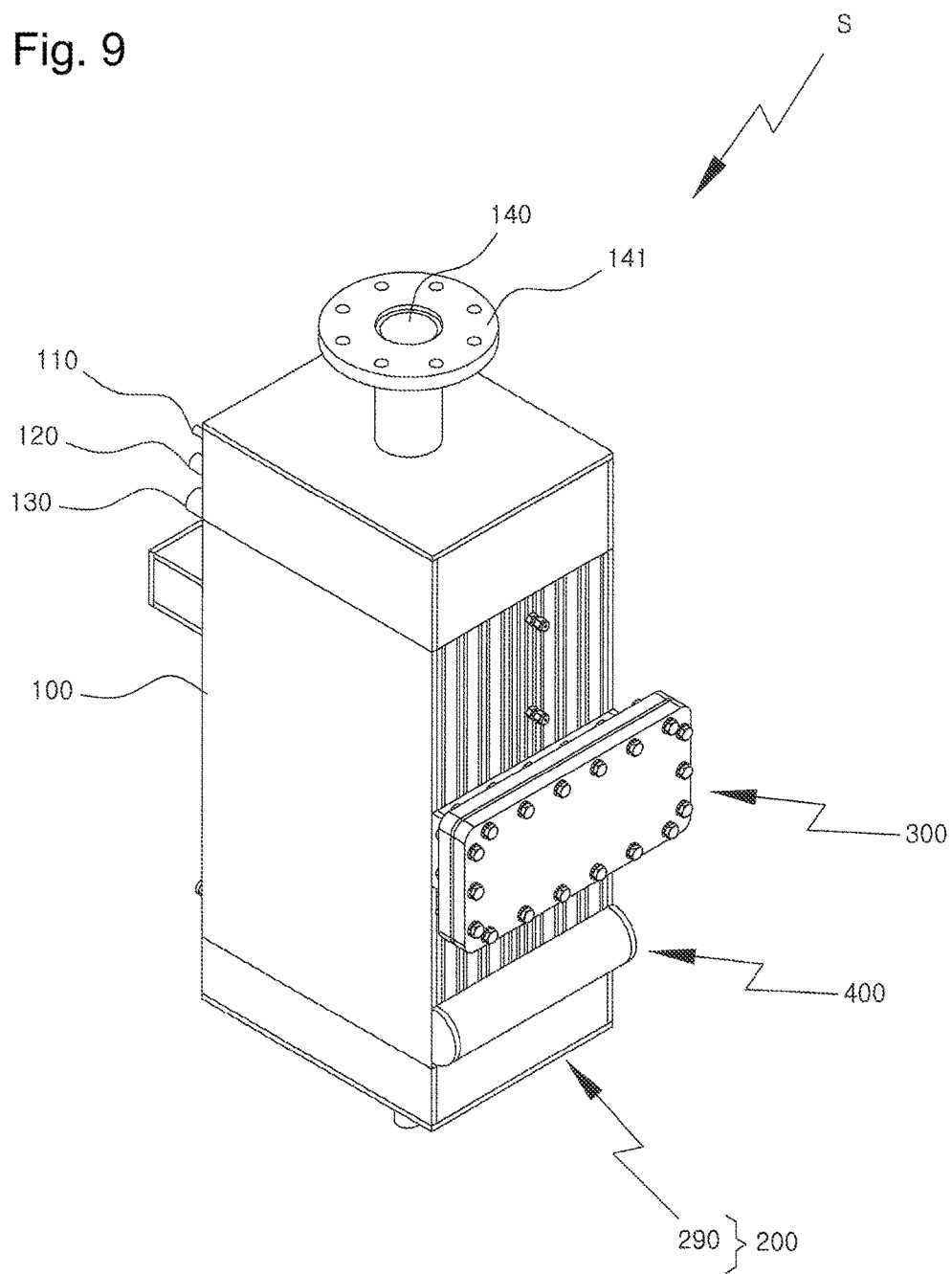
FIG. 9 is a perspective view showing another embodiment of the present invention.

The combustion part 250 is mounted to activate the reforming reaction, but when the catalyst is used as the combustion catalyst, the combustion part 250 is not required, and as a result, the header 290 which is the inflow passage of the high-temperature air is mounted on the bottom of the heat transfer unit 100 as shown in FIG. 9 and low-priced catalysts including a pellet type, a sphere type, and the like are used to reduce operating cost.

In addition, the catalyst input unit 300 is configured to include a mounting block 310 having a input/discharge hole 311 which facilitates coupling with the heat transfer unit 100 and is capable of inputting the catalyst, a catalyst fixing bar 320 inserted into the input/discharge hole 311 to stably support and fix the catalyst, a cover 340 fastened and fixed to the mounting block 310 in order to prevent the catalyst fixing bar 320 from being separated and removed, and a gasket 330 maintaining airtightness between the cover 340 and the mounting block 310 as shown in FIGS. 2 and 7 and has a structure in which opening is easy at the time of inputting the catalyst input for the reforming reaction.

Figure 8:
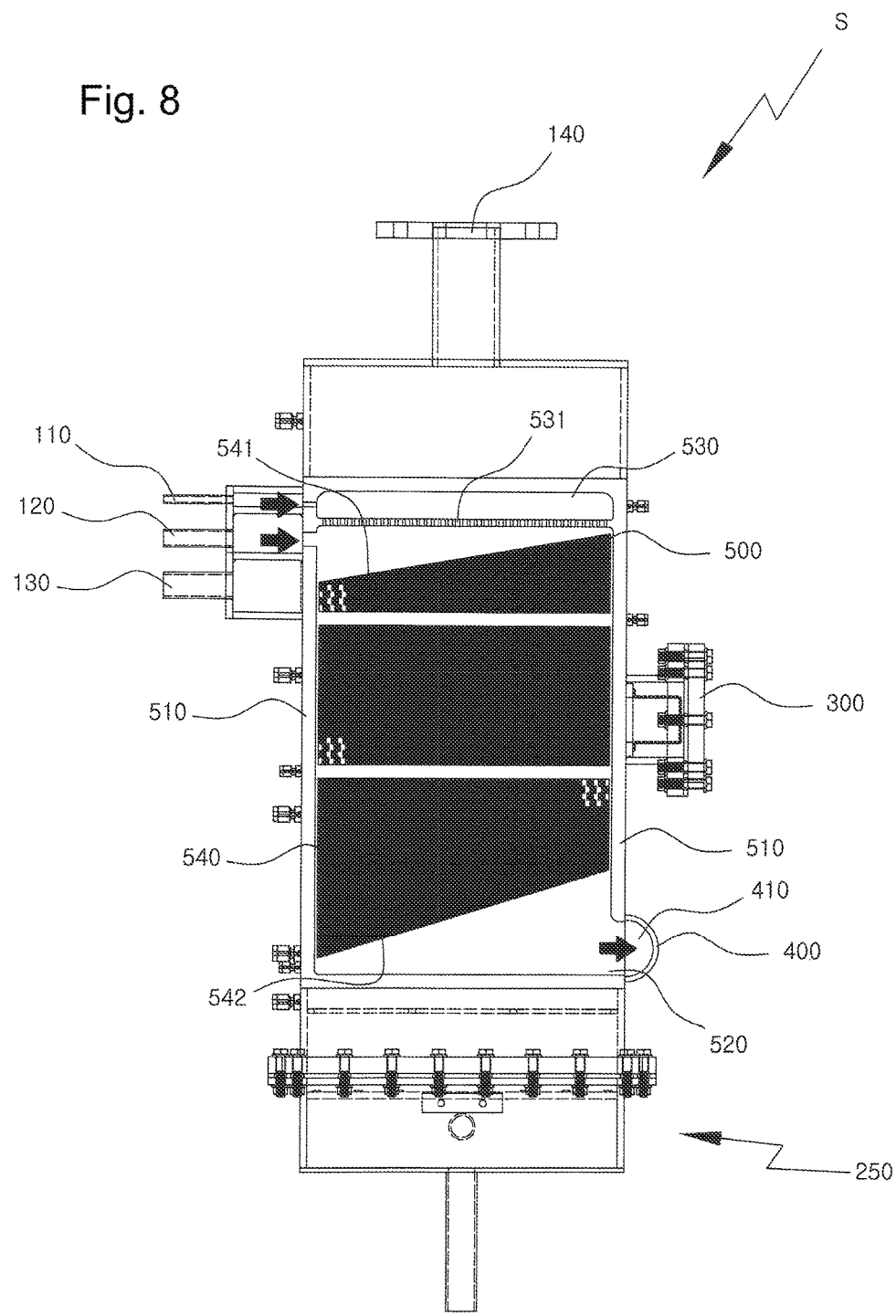
FIG. 8 is a front configuration diagram showing a state in which a preheating channel part in the reformer of the present invention is mounted.

Further, the distribution housing 400 guides the reforming gas subjected to the reforming reaction to be discharged through the discharge pipe 130 in the reforming channel part 600 and is detachably mounted on one side of the bottom of the heat transfer unit 100, therefore, when additionally described, the distribution housing 400 has a semicylindrical shape in which the distribution housing 400 is cut in the longitudinal direction and has a distribution chamber 410 to facilitate a flow including inflow and outflow of gas, which is formed therein as shown in FIGS. 7 and 8.

In addition, the preheating channel part 500 integrated with the heat transfer unit 100 is formed by a disk-like plate as shown in FIG. 8 and an outflow preventing jaw 510 is configured on the periphery of the preheating channel part 500 so as to prevent the water and the natural gas which flow in from flowing out and an outlet groove 520 guiding gas to easily move to the reforming channel part 600 is formed on a lower corner, an injection unit 530 having an injection 531 temporarily storing and uniformly distributing and minutely injecting the water, which is integrally configured on the bottom thereof is configured on one side of the water inflow pipe 110 through which the water flows, and a heating fin 540 is provided below the injection unit 530.

In particular, the water injected from the injection 531 is widely and uniformly distributed in a vertical direction and a diagonal direction of a wall.

Moreover, a distribution unit 541 inclined to uniformly distribute and move the natural gas which flows in downward is formed above the heat transfer fin 540 and an extension opening part 542 of which the end extends toward the outlet groove 520 is configured on the other side of the distribution part 541 so as to easily discharge mixed gas to minimize the pressure drop.

In this case, only a part of the outflow preventing jaw 510 at the inflow pipe 120 through which the natural gas flows and a part of the outlet groove 520 allowing the gas to move to the reforming channel are just opened and the residual parts of the outflow preventing jaw 510 has a structure in which the airtightness is maintained and in particular, only the outflow preventing jaw 510 on the periphery is present in the present invention, and as a result, there is no concern about the pressure drop as compared with the case in which the channel (path) is manufactured in a complicated structure in the related art.

Further, the reforming channel part 600 is formed by the disk-like plate as shown in FIG. 7 and an outflow preventing jaw 610 is configured on the periphery of the reforming channel part 600 so as to prevent the mixed gas which flows from the preheating plate 500 from flowing out, an inflow groove 620 through which the mixed gas discharged from the preheating plate 500 flows is formed on the lower corner, and an input groove 630 is configured on the top of the inflow groove 620 so that the catalyst input through the catalyst input unit 300 flows into the reforming plate 600, while a distribution diffusion layer 640 is configured on the inner bottom of the reforming channel part 600 so that the mixed gas which flows through the inflow groove 620 is uniformly distributed.

Only a part of the reforming channel part 600 where the fluid (gas) flows in and out also has an opened structure, and as a result, the airtightness is maintained in overall and the reforming channel part 600 is structurally conveniently configured.

Figure 6:
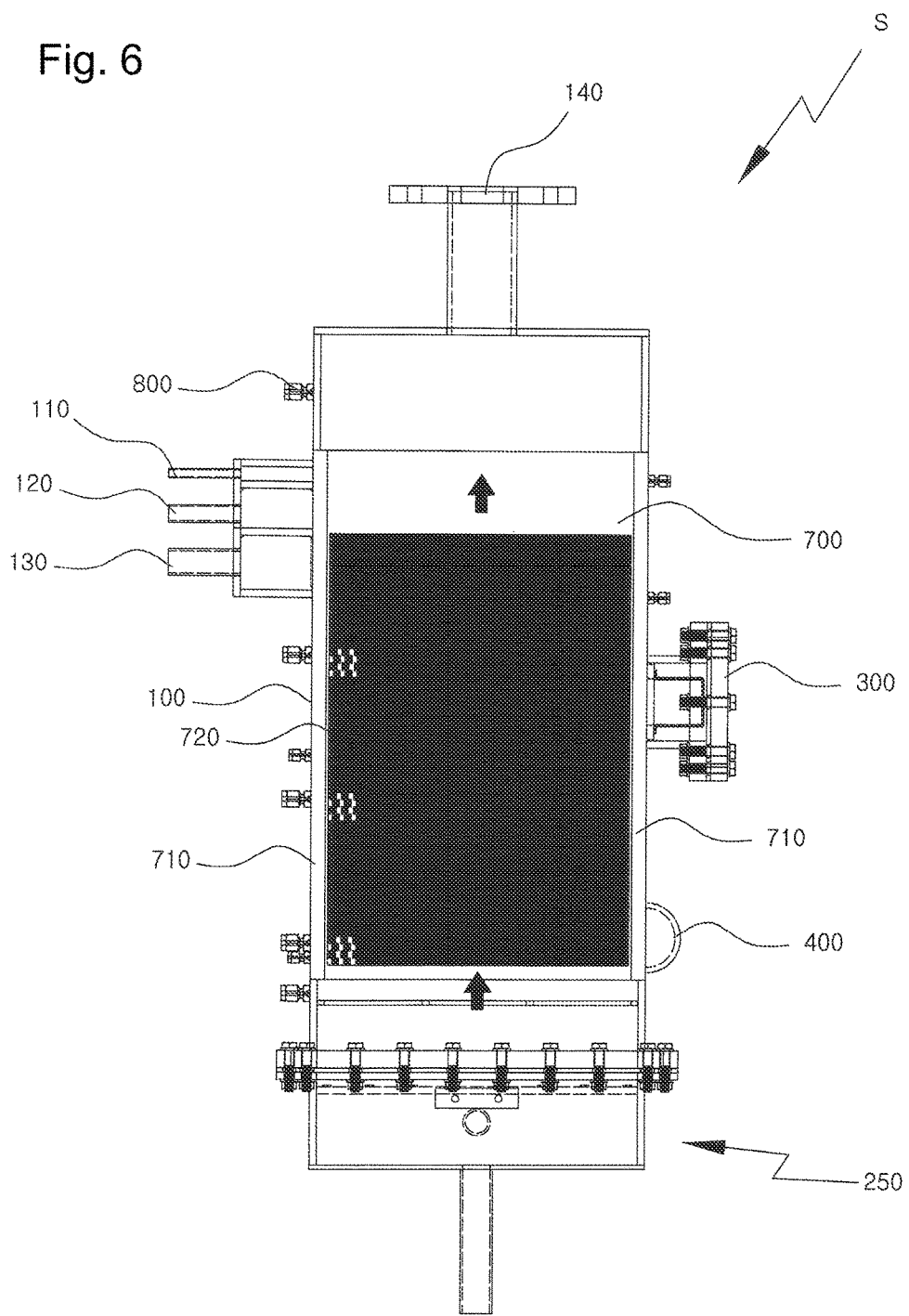
FIG. 6 is a front configuration diagram showing a state in which an exhaust gas channel part in a reformer of the present invention is mounted.

Further, the exhaust gas channel part 700 is formed by the disk-like plate as shown in FIG. 6 and has a structure in which the top and the bottom are opened and includes an outflow preventing jaw 710 configured on the side thereof so as to prevent the exhausted gas from flowing out, and a heat transfer fin 720 is mounted inside the outflow preventing jaw 710.

When an operation of the multi-channel upright reformer S for a fuel cell merged with a heater according to the present invention, which has such a feature is described, first, the combustion part 250 is actuated by actuating the ignition switch 240 and heat generated from the combustion part 250 is transferred to the preheating channel part 500 to preheat the preheating channel part 500.

When the preheating is verified, the water and the natural gas are allows to flow into the preheating channel part 500 by opening the water inflow pipe 110 and the inflow pipe 120.

In this case, when the water which flows in is discharged from the injection unit 530 through the injection 531, the water is discharged in a minute injection form and the inflow water becomes a vapor state while passing through the preheating channel part 500 to move to the reforming channel part 600 simultaneously with gas.

Further, the mixed gas which moves to the reforming channel part 600 causes a reforming reaction by the catalyst, and as a result, the reformed reforming gas is discharged through the discharge pipe 130 and the combusted exhaust gas generated from the combustion part 250 is finally discharged to the exhaust port 140 through the exhaust gas channel part 700.

What is claimed is:

1. A multi-channel upright reformer for a fuel cell merged with a heater, comprising:
    a heat transfer unit 100 in which each of a water inflow pipe 110 through which water flows into a preheating channel part 500 and an inflow pipe 120 through which natural gas for reforming flows into the preheating channel part 500 is configured, a discharge pipe 130 through which reformed reforming gas is discharged is formed on the bottom of the inflow pipe 120 and an exhaust port 140 through which a combustion exhaust gas is discharged is formed on the top of the inflow pipe 120, a connection unit 150 is integrally formed on the other side of the heat transfer unit 100 so as to be easily hermetically joined coupled with a combustion supporting unit 200, and an exhaust gas channel part 700 guiding the combusted exhaust gas to be exhausted, a reforming channel part 600 in which an actual reforming reaction is achieved and the discharge pipe 130 is connected, and the preheating channel part 500 in which the water inflow pipe 110 and the inflow pipe 120 through which the water and the natural gas flow are connected and preheating is achieved;
    a combustion supporting unit 200 on which either any one of a combustion part 250 generating heat through combustion by using the natural gas and stack unreaction fuel as raw materials or a heater which an inflow passage of high-temperature air when the combustion part 250 is not mounted is detachably mounted and fixed;
    a catalyst input unit 300 having a structure in which opening is easy at the time of inputting the catalyst input for the reforming reaction and mounted on the other side of the inflow pipe 120 through which the natural gas flows in a structure to be easily opened with the heat transfer unit 100 and
    a distribution housing 400 guiding the reforming gas subjected to the reforming reaction to be discharged through the discharge pipe 130 in the reforming channel part 600 and detachably mounted on one side of the bottom of the heat transfer unit 100,
    wherein the heat transfer unit 100 includes each of one or more preheating channel parts 500 in which the water and the natural gas flow and are preheated, one or more reforming channel parts 600 guiding the actual reforming reaction of the natural gas and the water by the catalyst, and one or more exhaust gas channel parts 700 guiding gas combusted in the combustion unit 200 to be discharged, and
    the reforming channel parts 600 are configured at left and right sides based on the center of the preheating channel part 500, respectively, the exhaust gas channel parts 700 are configured at left and right sides of the reforming channel part 600, respectively, and the preheating channel parts 500, the reforming channel parts 600, and the exhaust gas channel parts 700 are uprightly mounted in the heat transfer unit 100 to facilitate preheating and discharge of the combusted gas,
    wherein the preheating channel part 500 integrated with the heat transfer unit 100 is formed by an outflow preventing jaw 510 is configured on the periphery of the preheating channel part 500 so as to prevent the water and the natural gas which flow in from flowing out and an outlet groove 520 guiding gas to easily move to the reforming channel part 600 is formed on a lower corner of the preheating channel part 500, an injection unit 530 having an injection 531 temporarily storing and uniformly distributing and minutely injecting the water to the preheating channel part 500, which is integrally configured on the bottom of the injection unit 530 is configured on one side of the water inflow pipe 110 through which the water flows, and a heating fin 540 is provided below the injection unit 530 and a distribution unit 541 inclined to uniformly distribute and move the natural gas which flows in downward is formed above the heat transfer fin 540 and an extension opening part 542 of which the end extends toward the outlet groove 520 is configured on the other side of the distribution part 541 so as to easily discharge mixed gas.

2. The multi-channel upright reformer of claim 1, wherein a sealing gasket 260 is configured between the connection unit 150 of the heat transfer unit 100 and the combustion supporting unit 200.

3. The multi-channel upright reformer of claim 1, wherein a filter 170 for filtering minute dust is configured on one side of the discharge pipe 130 between the heat transfer unit 100 and the discharge pipe 130.

4. The multi-channel upright reformer of claim 1, wherein the exhaust port 140 has a connection unit 141 so as to be fixed with an extended pipe by any one method of flange joining, screw coupling, and a fusion coupling method by welding.

5. The multi-channel upright reformer of claim 1, wherein the combustion part 250 comprises:
    a combustor 241 with a top opened and provided in the combustion part 250;
    a heat diffusion unit 242 formed with either of a panel sheet or a metallic net having multiple through-holes configured to guide heat to be diffused in overall is configured inside the combustor 241;
    a connection unit 210 corresponding to the connection unit 150 of the heat transfer unit 100 and formed on one side of the edge of the combustor 241;
    an air inflow port 220 through which combustion air flows;
    a natural gas inflow port 230 through which combustion natural gas flows at one side of the combustor 241; and
    an ignition switch 240 provided on one front side of the combustor 241 to transfer heat to the preheating channel part 500.

6. The multi-channel upright reformer of claim 1, wherein the catalyst input unit 300 is configured to include a mounting block 310 having a input/discharge hole 311 which facilitates coupling with the heat transfer unit 100 and is capable of inputting the catalyst, a catalyst fixing bar 320 inserted into the input/discharge hole 311 to stably support and fix the catalyst, a cover 340 fastened and fixed to the mounting block 310 in order to prevent the catalyst fixing bar 320 from being separated and removed, and a gasket 330 maintaining airtightness between the cover 340 and the mounting block 310.

7. The multi-channel upright reformer of claim 1, wherein the distribution housing 400 is mounted on the heat transfer unit 100 and has a semicylindrical shape in which the distribution housing 400 is cut in the longitudinal direction and has a distribution chamber 410 to facilitate a flow including inflow and outflow of gas, which is formed therein.

8. The multi-channel upright reformer of claim 1, wherein the exhaust gas channel part 700 has a structure in which the top and the bottom are opened and includes an outflow preventing jaw 710 configured on the side thereof so as to prevent the exhausted gas from flowing out, and a heat transfer fin 720 is mounted inside the outflow preventing jaw 710.

9. The multi-channel upright reformer of claim 1, wherein one or more sensors 800 are mounted and fixed onto an exterior of the heat transfer unit 100 so as to sense an internal temperature of the heat transfer unit 100 and an exhaust state of the catalyst.

10. A multi-channel upright reformer for a fuel cell merged with a heater, comprising:

a heat transfer unit 100 in which each of a water inflow pipe 110 through which water flows into a preheating channel part 500 and an inflow pipe 120 through which natural gas for reforming flows into the preheating channel part 500 is configured, a discharge pipe 130 through which reformed reforming gas is discharged is formed on the bottom of the inflow pipe 120 and an exhaust port 140 through which a combustion exhaust gas is discharged is formed on the top of the inflow pipe 120, a connection unit 150 is integrally formed on the other side of the heat transfer unit 100 so as to be easily hermetically joined coupled with a combustion supporting unit 200, and an exhaust gas channel part 700 guiding the combusted exhaust gas to be exhausted, a reforming channel part 600 in which an actual reforming reaction is achieved and the discharge pipe 130 is connected, and the preheating channel part 500 in which the water inflow pipe 110 and the inflow pipe 120 through which the water and the natural gas flow are connected and preheating is achieved;

a combustion supporting unit 200 on which either any one of a combustion part 250 generating heat through combustion by using the natural gas and stack unreaction fuel as raw materials or a heater which an inflow passage of high-temperature air when the combustion part 250 is not mounted is detachably mounted and fixed;

a catalyst input unit 300 having a structure in which opening is easy at the time of inputting the catalyst input for the reforming reaction and mounted on the other side of the inflow pipe 120 through which the natural gas flows in a structure to be easily opened with the heat transfer unit 100 and a distribution housing 400 guiding the reforming gas subjected to the reforming reaction to be discharged through the discharge pipe 130 in the reforming channel part 600 and detachably mounted on one side of the bottom of the heat transfer unit 100, wherein the heat transfer unit 100 includes each of one or more preheating channel parts 500 in which the water and the natural gas flow and are preheated, one or more reforming channel parts 600 guiding the actual reforming reaction of the natural gas and the water by the catalyst, and one or more exhaust gas channel parts 700 guiding gas combusted in the combustion unit 200 to be discharged, and the reforming channel parts 600 are configured at left and right sides based on the center of the preheating channel part 500, respectively, the exhaust gas channel parts 700 are configured at left and right sides of the reforming channel part 600, respectively, and the preheating channel parts 500, the reforming channel parts 600, and the exhaust gas channel parts 700 are uprightly mounted in the heat transfer unit 100 to facilitate preheating and discharge of the combusted gas, wherein the reforming channel part 600 is formed by an outflow preventing jaw 610 is configured on the periphery of the reforming channel part 600 so as to prevent a mixed gas which flows from the preheating part 500 from flowing out, an inflow groove 620 through which the mixed gas discharged from the preheating part 500 flows is formed on a lower corner, and an input groove 630 is configured on the top of the inflow groove 620 so that the catalyst input through the catalyst input unit 300 flows into the reforming part 600, while a distribution diffusion layer 640 is configured on the inner bottom of the reforming channel part 600 so that the mixed gas which flows through the inflow groove 620 is uniformly distributed.

* * * * *